United States Patent Office 3,567,725
Patented Mar. 2, 1971

3,567,725
PROCESS FOR PREPARATION OF 1H-IMIDAZO-[4,5-b]PYRAZIN-2-ONES
Edward J. J. Grabowski, Iselin, Edward W. Tristram, Cranford, and Roger J. Tull, Metuchen, N.J., assignors to Merck & Co., Inc., Rahway, N.J.
No Drawing. Filed Nov. 20, 1968, Ser. No. 777,478
Int. Cl. C07d 51/76
U.S. Cl. 260—250                                     20 Claims

ABSTRACT OF THE DISCLOSURE

A process is described for the preparation of 5-amino-(or substituted amino) - 6 - chloro-1H-imidazo[4,5-b]-pyrazin-2-ones which comprises heating a 3 - amino-5-amino(or substituted amino)-6-chloropyrazinoylaminimide either in a suitable solvent or as a solid until rearrangement and ring closure is complete. The products have utility as antihypertensive agents.

---

This invention relates to a novel process for the preparation of 1H-imidazo[4,5-b]pyrazin - 2-ones from novel derivatives of 3-aminopyrazinoic acids. In particular it relates to the novel process of preparing 5-amino- (or substituted amino)-6-chloro-1H - imidazo[4,5-b]pyrazin-2-ones from novel (3-amino-5-amino(or substituted amino-6-chloropyrazinoyl)aminimides. The process is represented by the following equation:

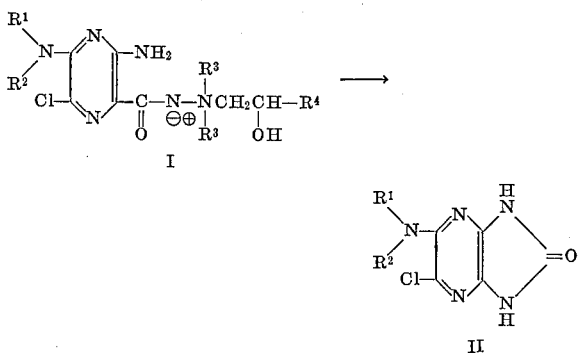

wherein
$R^1$ represents
(1) hydrogen,
(2) lower cycloalkyl of from 3 to about 7 carbon atoms, e.g., cyclopropyl, cyclopentyl, cyclohexyl, cycloheptyl and the like,
(3) mononuclear aryl, especially phenyl,
(4) amidino, substituted with lower alkyl, or lower alkylcarbonyl,
(5) lower alkynyl of from 3 to about 5 carbon atoms such as propargyl,
(6) lower alkenyl of from 3 to about 5 carbon atoms, such as allyl,
(7) lower alkyl of from 1 to about 6 carbon atoms either straight or branched chain such as methyl, ethyl, propyl, isopropyl, butyl, isobutyl, sec.-butyl, tert.-butyl, pentyl, isopentyl, neopentyl, hexyl and the like, either unsubstituted or substituted with such as
  (a) hydroxy,
  (b) lower alkoxy of from 1 to about 3 carbon atoms, e.g., methoxy, ethoxy, propoxy and the like,
  (c) pyridyl,
  (d) mononuclear aryl, especially phenyl, either unsubstituted or substituted with halo,
  (e) amino having the structure

wherein
$R^5$ represents
(1) hydrogen,
(2) lower alkyl of from 1 to about 5 carbon atoms, e.g., methyl, ethyl, propyl, isopropyl, butyl, isobutyl, sec.-butyl, pentyl, isopentyl, neopentyl and the like,
(3) lower alkylcarbonyl, of from 2 to about 3 carbon atoms, e.g., acetyl, propionyl, and the like;
$R^6$ represents
(1) hydrogen,
(2) lower alkyl, of from 1 to about 5 carbon atoms, e.g., methyl, ethyl, propyl, isopropyl, butyl, isobutyl, sec.-butyl, pentyl, isopentyl, neopentyl, and the like;
$R^5$ and $R^6$ when lower alkyl can be linked together either directly or through a hetero atom such as nitrogen or oxygen to form a heterocycle with the nitrogen to which they are attached, e.g., piperidino, pyrrolidinyl, morpholino, piperazinyl, N-lower alkylpiperazinyl, and the like;

$R^2$ represents hydrogen or lower alkyl of 1 to about 3 carbon atoms such as methyl, ethyl and propyl;
$R^1$ and $R^2$ when lower alkyl can be linked together either directly or through a hetero atom such as nitrogen or oxygen to form a heterocycle with the nitrogen atom to which they are attached forming, e.g., piperidino, pyrrolidinyl, morpholino, piperazinyl, N-lower alkylpiperazinyl, and the like;
$R^3$ represents lower alkyl of 1 to about 3 carbon atoms such as methyl, ethyl and propyl;
$R^4$ is hydrogen or lower alkyl of 1 to about 6 carbons.

The novel process of this invention comprises heating the novel starting material of Formula I, either neat, in solution, or in suspension in a diluent which causes a rearrangement and ring closure to the product II. The reaction is best conducted in an inert organic solvent for I with a boiling point greater than about 75° C., such as xylene, 2-methoxyethanol, or diethylene glycol dimethyl ether, ethanol, pyridine, s-collidine, dimethylformamide, dimethylsulfoxide, p-chlorobenzene, toluene, 1,1,2,2-tetrachloroethane, 1,1,2,2-tetrachloroethylene, or the like, by heating the solution to a temperature between about 75°

C. and the melting point of the paricular solute for from 0.5 to about 5 hours followed by cooling, and quenching into an inert solvent such as water or n-hexane, if necessary, which causes precipitation of the product II. Although the reaction is best conducted in solution as described above, comparable results, as suggested, are also obtained by heating compound I to its melting point until fusion is complete, or by suspending the starting material in an organic liquid with a boiling point above the melting point of the starting compound, and heating the suspension until reaction is complete.

The products of the process of this invention are orally active, relatively non-toxic, highly effective antihypertensive agents with a moderate degree of diuretic and saluretic activities. They can be administered in the form of pills, tablets, capsules, elixirs, injectable preparations, and the like, in compositions which comprise one or more of the compounds of Formula II as the only active ingredient or in combination with other therapeutic ingredients. The compounds are advantageously administered at a dosage range of from about 5 mg. per day to about 750 mg. per day per 70 kg. of body weight. The dosage can be given in subdivided amounts on a two-four time a day regimen.

Compounds of Formula II are tautomeric in nature and exist as 1H-imidazo[4,5-b]pyrazin-2-ones (the structure shown in Formula II) and as the corresponding 1H-imidazo[4,5-b]pyrazin-2-ols (the structures shown by Formulae IIa and IIb) as follows:

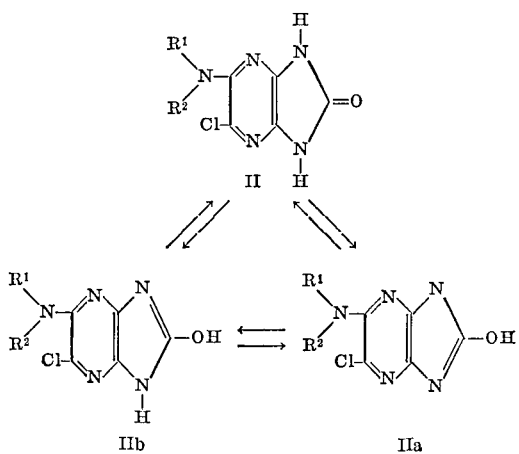

Although the enol forms represented by Formulae IIa and IIb may comprise a significant or predominant form of a given compound, for the sake of brevity, only one form is referred to throughout this specification. It should be understood, however, that the present invention is inclusive of the production of compounds represented by all tautomeric structures.

The novel starting materials, I, for the process of this invention are prepared by the following reaction sequences:

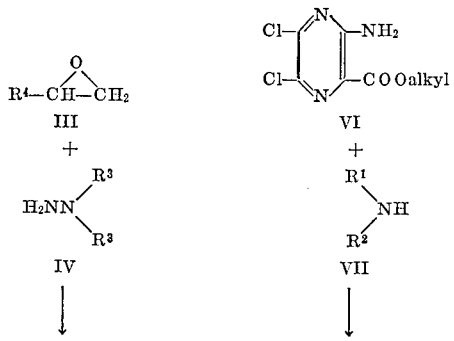

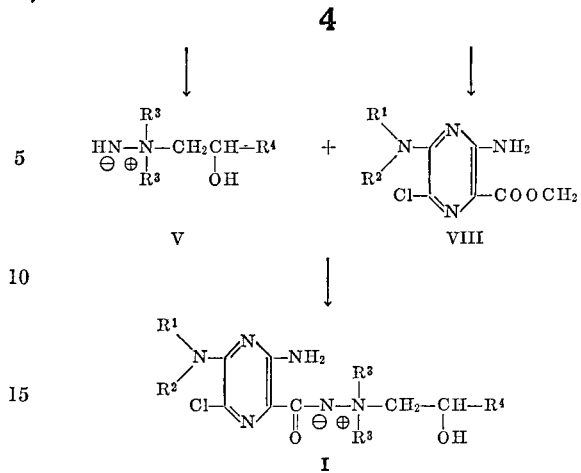

The aminimines of Formula V are prepared by treating an alkylene oxide of Formula III, wherein $R^4$ is hydrogen or a $C_{1-6}$ alkyl group, with a 1,1-di(lower alkyl) hydrazine, represented by Formula IV, wherein $R^3$ is a $C_{1-3}$ alkyl group. The reaction is conducted by dissolving the two reagents in approximately equimolar proportions (a slight excess of III is advantageous) in a polar solvent such as a lower alkanol, e.g., methanol, ethanol or propanol. The reaction can be conducted at any temperature between about ice-bath temperature and about ambient temperature, over a period of from about 10 to about 24 hours. The product V is normally not isolated, but is instead treated directly with the pyrazinoic acid ester of Formula VIII as described below.

The intermediate esters of Formula VIII are prepared by treating methyl 3-amino-5,6-dichloropyrazinoate (VI), with an amine of structure VII in a lower alkanol at reflux temperature. Cooling the reaction mixture causes the product VIII to crystallize from solution.

Treatment of the reaction mixture containing the aminimine (V) prepared as described above, with approximately an equimolar amount of the ester (VIII), and heating the resulting solution to about 65° C. to 100° C. for from about 16 hours to about 48 hours results in the formation of the aminimide of structure I, which can be isolated by evaporation of the solvent.

The following preparations and examples illustrate the preparation of the intermediates and the process of this invention respectively. It is to be understood that they are examples only and are not intended to define the limits of substituents and/or reaction conditions of the invention, but rather the limits extend to reasonable variations recognized by those skilled in the art.

(A) Preparation of methyl 3-amino-5-substituted-amino-6-chloropyrazinoates

Preparation A-1: Methyl 3-amino-5-ethylamino-6-chloropyrazinoate.—A suspension of methyl 3-amino-5,6-dichloropyrazinoate (178 g., 0.8 mole) in 2-propanol (1.1 liters) is stirred while ethylamine (4.4 moles) in 2-propanol (2 liters) is added, and the mixture is refluxed for an hour. The product that separates on cooling is collected by filtration and dried. The yield is 89%. After recrystallization from 2-propanol, the methyl 3-amino-5-ethylamino-6-chloropyrazinoate melts at 149–150° C.

Analysis.—Calcd. for $C_8H_{11}ClN_4O_2$ (percent): C, 41.66; H, 4.81; N, 24.29. Found (percent): C, 42.11; H, 5.05; N, 24.24.

By employing substantially the same method as in Preparation A-1, but substituting for the ethylamine, equimolar quantities of the amines identified in Table I, there is obtained the corresponding methyl 3-amino-5-substituted-amino-6-chloropyrazinoates also identified in Table I according to the equation therein.

TABLE I

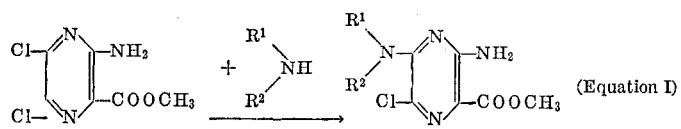 (Equation I)

| | R¹ | R² | M.P. °C. | Formula | Calculated C | Calculated H | Calculated N | Found C | Found H | Found N |
|---|---|---|---|---|---|---|---|---|---|---|
| Preparation: | | | | | | | | | | |
| A-2 | CH≡C—CH₂— | H | 168-9 | C₉H₉ClN₄O₂ | 44.92 | 3.77 | 23.28 | 44.82 | 3.73 | 23.09 |
| A-3 | CH₃OCH₂CH₂— | H | 142-44 | C₉H₁₃N₄O₃Cl | 41.47 | 5.03 | 21.49 | 41.56 | 5.03 | 21.38 |
| A-4 | (4-pyridyl)-CH₂— | H | 190-191 | C₁₂H₁₂ClN₅O₂ | 49.07 | 4.12 | 23.85 | 49.39 | 4.06 | 23.88 |
| A-5 | (3-pyridyl)-CH₂— | H | 170-71 | C₁₂H₁₂N₅O₂Cl | 49.07 | 4.12 | 23.85 | 49.36 | 4.18 | 23.61 |
| A-6 | CH₃CONH(CH₂)₂— | H | 208-10 | C₁₀H₁₄N₅O₃Cl | 41.75 | 4.90 | 24.34 | 42.04 | 4.85 | 24.69 |
| A-7 | i-PrNH(CH₂)₃— | H | 125-7 | C₁₂H₂₀N₅O₂Cl | 47.76 | 6.68 | 23.21 | 47.95 | 6.31 | 23.45 |
| A-8 | CH₃CONH(CH₂)₃— | H | 180-182 | C₁₁H₁₆N₅O₃Cl | 43.78 | 5.35 | | 44.21 | 5.07 | |
| A-9 | (C₂H₅)₂NCH₂CH₂— | H | 114-16 | C₁₂H₂₀N₅O₂Cl | 47.76 | 6.68 | 23.21 | 47.88 | 6.63 | 23.13 |
| A-10 | (C₂H₅)₂NCH₂CHOHCH₂— | H | 174 dec. | C₁₃H₂₃ClN₅O₃·2HCl | 38.58 | 5.98 | 17.31 | 38.97 | 5.88 | 17.12 |
| A-11 | (CH₃)₂NH—(CH₂)₃— | H | 108-09 | C₁₁H₁₈N₅O₂Cl | 45.91 | 6.30 | 24.34 | 46.30 | 6.26 | 24.43 |
| A-12 | (CH₃)₂N(CH₂)₃— | H | 170-171 | C₁₂H₂₀ClN₅O₂HCl | 42.61 | 6.20 | | 42.40 | 5.67 | |
| A-13 | pyrrolidinyl-(CH₂)₂— | H | 121-22 | C₁₂H₁₈N₅O₂Cl | 48.08 | 6.05 | 23.37 | 48.31 | 6.40 | 23.76 |
| A-14 | CH₃N-piperazinyl-(CH₂)₃— | H | 148-49 | C₁₄H₂₃N₆O₂Cl | 49.05 | 6.76 | 24.52 | 48.95 | 6.64 | 24.50 |
| A-15 | O-morpholinyl-(CH₂)₃— | H | 158-60 | C₁₃H₂₀N₅O₃Cl | 47.34 | 6.11 | 21.24 | 47.41 | 6.04 | 21.17 |
| A-16 | CH₃(CH₂)₂— | CH₃— | 83-5 | C₁₀H₁₅N₄ClO₂ | 46.42 | 5.84 | 21.66 | 46.55 | 5.75 | 21.70 |
| A-17 | HOCH₂CH₂— | CH₃— | 175-178 | C₉H₁₃N₄O₃Cl | 41.47 | 5.03 | 21.49 | 41.99 | 5.18 | 21.21 |
| A-18 | —CH₂CH₂—N(C₂H₅)—CH₂CH₂— | | 143-45 | C₁₂H₁₈N₅O₂Cl | 48.08 | 6.05 | 23.36 | 47.97 | 6.11 | 23.19 |
| A-19 | —CH₂CH₂O—CH₂CH₂— | | 197-8 | C₁₀H₁₃N₄O₃Cl | 44.04 | 4.80 | 20.55 | 44.32 | 4.74 | 20.67 |
| A-20 | CH₃,n-C₄H₉-N(CH₂)₂ | H | 157-158 | C₁₇H₂₆ClN₅O₆ (maleate) | 47.28 | 6.07 | 16.22 | 47.43 | 6.06 | 16.52 |
| A-21 | (CH₃)₂N(CH₂)₃— | CH₃— | 202-203 | C₁₂H₂₀ClN₅O₂(HCl) | 42.61 | 6.26 | 20.71 | 42.51 | 6.09 | 21.02 |
| A-22 | (C₂H₅)₂N(CH₂)₂— | CH₃— | 51-54 | C₁₃H₂₂ClN₅O₂ | 49.44 | 7.02 | 22.18 | 49.65 | 6.67 | 22.30 |
| A-23 | =C—N(CH₃)₂, N(CH₃)₂ | | 203-204 | C₁₁H₁₇ClN₆O₂ | 43.93 | 5.69 | 27.94 | 43.85 | 5.54 | 28.17 |
| A-24 | —C(=NH)—NHCOCH₃ | H | 246-248 | C₉H₁₁ClN₆O₃ | 37.70 | 3.87 | 29.32 | 37.43 | 4.15 | 29.08 |
| A-25 | CH₃—N(COCH₃)—(CH₂)₂ | H | 175-179 | C₁₁H₁₆ClN₅O₃ | | | | | | |

(B) Preparation of 1,1-di(lower alkyl)-1-(2-hydroxy-lower alkyl)-2-(3-amino-5-substituted-amino-6-chloropyrazinoyl)aminimides Preparation B-1: 1,1-dimethyl-1-(2-hydroxypropyl)-2-(3-amino-5-ethylamino-6-chloropyrazinoyl)-aminimide.—A solution of 18 g. (0.31 mole) of propylene oxide in 200 ml. of methanol is cooled to 2° C. and 15 g. (0.25 mole) of 1,1-dimethylhydrazine in 50 ml. of methanol is added over a two minute period. The reaction temperature rises to 7° C. and then decreases to 2° C. The solution is allowed to warm spontaneously to ambient temperature over 16 hours.

To the reaction solution is added 46.1 g. (0.20 mole) of methyl 3-amino-5-ethylamino-6-chloropyrazinoate and the reaction solution is refluxed for 24 hours. The methanol is removed at reduced pressure and the residue is triturated with 150 ml. of isopropanol. The resulting precipitate is filtered, washed with 2× 50 ml. of isopropanol and dried to afford 49.4 g. (0.157 mole, 79%) of 1,1-dimethyl-1-(2-hydroxypropyl)-2-(3-amino-5-ethylamino-6-chloropyrazinoyl)aminimide, M.P. 173–175° C. (dec.).

Analysis.—Calcd for C₁₂H₂₁ClN₆O₂ (percent): C, 45.5; H, 6.7; N, 286.5. Found (percent): C. 45.2; H, 6.8; N, 26.5.

Employing the method of Preparation B-1, but substituting for the propylene oxide, 1,1-dimethylhydrazine and methyl 3-amino-5-ethylamino-6-chloropyrazinoate, equivalent amounts of the lower alkylene oxides, 1,1-di(lower alkyl)hydrazines and methyl 3-amino-5-substituted-amino-6-chloropyrazinoates respectively described in Table II, there are produced the 1,1-di(lower alkyl)-1-(2-hydroxy-lower alkyl)-2-(3-amino-5-substituted-amino-6-chloropyrazinoyl)aminimides also described in Table II.

TABLE II $$\underset{}{\triangle}-R^4 + H_2NN(R^3)_2 + \underset{Cl}{\underset{R^2}{\overset{R^1}{\underset{|}{N}}}}\underset{COOCH_3}{\overset{N}{\underset{}{\bigg\rangle}}}{-NH_2} \longrightarrow \underset{Cl}{\underset{R^2}{\overset{R^1}{\underset{|}{N}}}}\underset{\underset{O}{\overset{\|}{C}}-\overset{\ominus}{N}-\overset{(R^3)_2}{\underset{|}{\overset{\oplus}{N}}}-CH_2CH-R^4}{\overset{N}{\underset{}{\bigg\rangle}}}{-NH_2}$$
$$\phantom{xxxxxxxxxxxxxxxxxxxxxxxxxxxxxxxxxxxxxxxxxxxxxxxxxxxxxx}\overset{|}{OH}$$

| Preparation: | Ester from Preparation | R¹ | R² | R³ | R⁴ |
|---|---|---|---|---|---|
| B-2 | A-2 | CH≡C—CH₂— | H | CH₃— | C₂H₅— |
| B-3 | A-3 | CH₃OCH₂CH₂— | H | CH₃— | C₃H₇— |
| B-4 | A-4 | (2-pyridyl)-CH₂— | H | C₂H₅— | CH₃— |
| B-5 | A-5 | (2-pyridyl)-CH₂— | H | C₂H₅— | C₂H₅— |
| B-6 | A-6 | CH₃CONH(CH₂)₂— | H | C₂H₅— | C₃H₇— |
| B-7 | A-7 | i-PrNH(CH₂)₃— | H | C₂H₇ | CH₃— |
| B-8 | A-8 | CH₃CONH(CH₂)₃— | H | C₂H₇— | C₂H₅— |
| B-9 | A-9 | (C₂H₅)₂NCH₂CH₂— | H | C₃H₇— | C₃H₇— |
| B-10 | A-10 | (C₂H₅)₂NCH₂CHOHCH₂— | H | CH₃— | CH₃— |
| B-11 | A-11 | (CH₃)₂NH—(CH₂)₃— | H | CH₃— | CH₃— |
| B-12 | A-12 | (CH₃)₂N(CH₂)₄— | H | CH₃— | CH₃— |
| B-13 | A-13 | pyrrolidinyl-N—(CH₂)₂— | H | CH₃— | C₅H₁₁— |
| B-14 | A-14 | CH₃N(piperazinyl)N(CH₂)₃— | H | CH₃— | CH₃— |
| B-15 | A-15 | morpholinyl-N(CH₂)₃— | H | CH₃— | CH₃— |
| B-16 | A-16 | CH₃(CH₂)₂— | CH₃— | CH₃— | CH₃— |
| B-17 | A-17 | C₂H₅ | CH₃— | CH₃— | CH₃— |
| B-18 | A-18 | —CH₂CH₂—N—CH₂CH₂— | | | |
| B-19 | A-19 | —CH₂CH₂O—CH₂CH₂— | | CH₃— | CH₃— |
| B-20 | A-20 | CH₃, n—C₄H₉, N(CH₂)₂— | H | CH₃— | C₆H₁₃— |
| B-21 | A-21 | (CH₃)₂N(CH₂)₃— | CH₃— | CH₃— | CH₃— |
| B-22 | A-22 | (C₂H₅)₂N(CH₂)₂— | CH₃— | CH₃— | CH₃ |
| B-23 | A-23 | (CH₃)₂N—C—N(CH₃)₂ | | CH₃— | CH₃— |
| B-24 | A-24 | —C(=NH)—NHCOCH₃ | H | CH₃— | CH₂— |
| B-25 | A-25 | CH₃—N(COCH₃)—(CH₂)₂— | H | CH₂— | CH₃— |
| B-26 | Known | CH₃— | CH₃— | CH₃— | CH₃— |
| B-27 | do | C₂H₅— | C₂H₅— | CH₃— | CH₃— |
| B-28 | do | H | H | CH₃— | CH₃— |
| B-29 | do | CH₃— | H | CH₃— | CH₃— |
| B-30 | do | n—C₃H₇— | H | CH₃— | CH₃— |
| B-31 | do | CH₂=CHCH₂— | H | CH₃— | H |
| B-32 | do | n—C₄H₉— | H | CH₃— | CH₃— |
| B-33 | do | i—C₃H₇— | H | CH₃— | CH₃— |
| B-34 | do | i—C₄H₉— | H | CH₃— | CH₃— |
| B-35 | do | cyclopentyl | H | CH₃— | CH₃— |
| B-36 | do | HO(CH₂)₂— | H | CH₃— | CH₃— |
| B-37 | do | Cl—C₆H₄—CH₂— | H | CH₃— | H |
| B-38 | do | (pyridyl)—CH₂— | H | CH₃— | CH₃— |
| B-39 | do | (CH₃)₂N(CH₂)₂— | H | CH₃— | CH₃— |
| B-40 | do | C₆H₅— | H | CH₃— | CH₃— |
| B-41 | do | C₂H₅— | CH₃— | CH₃— | CH₃— |
| B-42 | do | (CH₂)₅ | | CH₃— | CH₃— |
| B-43 | do | (CH₂)₂—N(CH₃)—(CH₂)₂ | | CH₃— | H |

(C) Process for preparation of 1H-imidazo[4,5-b]pyrazin-2-ones

Example 1: 5-ethylamino-6-chloro-1H-imidazo[4,5-b]pyrazin-2-one.—A solution of 1,1-dimethyl-1-(2-hydroxypropyl)-2-(3 - amino - 5 - ethylamino-6-chloropyrazinoyl) aminimide (2.0 g.; 6.12 mmoles) (from Preparation B-1) in 100 ml. of xylene is heated at reflux for 1 hour. Cooling produces a fine yellow precipitate which is collected by filtration, washed with 2× 100 ml. of n-hexane, dried and recrystallized from ethanol/water (20 ml./30 ml.) to yield 0.71 g. (3.3 mmoles, 54%) of 5-ethylamino-6-chloro-1H-imidazo[4,5-b]pyrazin-2-one, M.P. 248–249° C. (dec.).

Similar results are obtained by the use of 2-methoxyethanol or diethylene glycol dimethyl ether in place of the xylene solvent.

Employing the procedure of Example 1, but substituting for the 1,1-dimethyl-1-(2-hydroxypropyl)-2-(3-amino-5 - ethylamino-6-chloropyrazinoyl)aminimide, equivalent amounts of the 1,1-di(lower alkyl)-1-(2-hydroxylower alkyl)-2-(3-amino-5-substituted-amino - 6 - chloropyrazinoyl)aminimides described in Table III there are produced the corresponding 5-substituted-amino-6-chloro-1H-imidazo[4,5-b]pyrazin-2-ones also described in Table III according to the equation included therein.

TABLE III

| Example | Aminimide from preparation | R¹ | R² | R³ | R⁴ | M.P. (° C.) |
|---|---|---|---|---|---|---|
| 2 | B-2 | CH≡C—CH₂— | H | CH₃— | C₂H₅— | |
| 3 | B-3 | CH₃OCH₂CH₂— | H | CH₃— | C₃H₇— | 229–231 |
| 4 | B-4 | (pyridin-yl)-CH₂— | H | C₂H₅— | CH₃— | 280 |
| 5 | B-5 | (pyridin-yl)-CH₂— | H | C₂H₅— | C₂H₅— | 271–272 |
| 6 | B-6 | CH₃CONH(CH₂)₂— | H | C₂H₅— | C₃H₇— | 235–238 |
| 7 | B-7 | i-PrNH(CH₂)₃— | H | C₃H₇— | CH₃— | 190–192 |
| 8 | B-8 | CH₃CONH(CH₂)₃— | H | C₃H₇— | C₂H₅— | 226–227 |
| 9 | B-9 | (C₂H₅)₂N(CH₂)₂— | H | C₃H₇— | C₃H₇— | 276–278 |
| 10 | B-10 | (C₂H₅)₂NCH₂CHOHCH₂— | H | CH₃— | CH₃— | 267–268 |
| 11 | B-11 | (CH₃)₂NH(CH₂)₃— | H | CH₃— | CH₃— | 188–190 |
| 12 | B-12 | (CH₃)₂N(CH₂)₄— | H | CH₃— | CH₃— | 278–279 |
| 13 | B-13 | (pyrrolidin)N—(CH₂)₂— | H | CH₃— | CH₃— | 149–150 |
| 14 | B-14 | CH₃N(piperazin)N(CH₂)₃— | H | CH₃— | C₅H₁₁— | 167–169 |
| 15 | B-15 | O(morpholin)N(CH₂)₃— | H | CH₃— | CH₃— | 154–156 |
| 16 | B-16 | CH₃(CH₂)₂— | CH₃— | CH₃— | CH₃— | 215–216 |
| 17 | B-17 | HO(CH₂)₂— | CH₃— | CH₃— | CH₃— | 250–251 |
| 18 | B-18 | —CH₂CH₂—N(C₂H₅)—CH₂CH₂— | | CH₃— | CH₃— | 307 |
| 19 | B-19 | —CH₂CH₂O—CH₂CH₂— | | CH₃— | CH₃— | 272–273 |
| 20 | B-20 | CH₃\N(CH₂)₂—/n-C₄H₉ | H | CH₃— | C₆H₁₃— | 254–255 |
| 21 | B-21 | (CH₃)₂N(CH₂)₃— | CH₃— | CH₃— | CH₃— | 229–230 |
| 22 | B-22 | (C₂H₅)₂N(CH₂)₂— | CH₃— | CH₃— | CH₃— | 244 |
| 23 | B-23 | (CH₃)₂N—C—N(CH₃)₂ | | CH₃— | CH₃— | 285 |
| 24 | B-24 | —C(=NH)—NH₂ | H | CH₃— | CH₃— | >300 |
| 25 | B-25 | CH₃—N(COCH₃)—(CH₂)₂ | H | CH₃— | CH₃— | 227–228 |
| 26 | B-26 | CH₃— | CH₃— | CH₃— | CH₃— | 216–217 |
| 27 | B-27 | C₂H₅— | C₂H₅— | CH₃— | CH₃— | 207–208 |
| 28 | B-28 | H | H | CH₃— | CH₃— | >300 |
| 29 | B-29 | CH₃— | H | CH₃— | CH₃— | >280 |
| 30 | B-30 | n-C₃H₇— | H | CH₃— | CH₃— | 215–216 |
| 31 | B-31 | CH₂=CHCH₂— | H | CH₃— | H | 224–225 |
| 32 | B-32 | n-C₄H₉— | H | CH₃— | CH₃— | 197–198 |
| 33 | B-33 | i-C₃H₇— | H | CH₃— | CH₃— | 247–249 |

TABLE III—Continued

| Aminimide from preparation | R¹ | R² | R³ | R⁴ | M.P. (°C.) |
|---|---|---|---|---|---|
| 34 — B-34 | t-C₄H₉— | H | CH₃— | CH₃— | 235 |
| 35 — B-35 | (cyclopentyl) | H | CH₃— | CH₃— | 256–257 |
| 36 — B-36 | HO(CH₂)₂— | H | CH₃— | CH₃— | 250–251 |
| 37 — B-37 | Cl—C₆H₄—CH₂— | H | CH₃— | H | 270–271 |
| 38 — B-38 | (pyridyl)—CH₂— | H | CH₃— | CH₃— | 291–293 |
| 39 — B-39 | (CH₃)₂N(CH₂)₂— | H | CH₃— | CH₃— | 219–220 |
| 40 — B-40 | C₆H₅— | H | CH₃— | CH₃— | 257 |
| 41 — B-41 | C₂H₅— | CH₃— | CH₃— | CH₃— | 203–205 |
| 42 — B-42 | (CH₂)₅ | | CH₃— | CH₃ | 229 |
| 43 — B-43 | (CH₂)₂—N(CH₃)—(CH₂)₂ | | CH₃— | H | 275 |

FORMULATION 1

Dry filled capsule containing 50 mg. of active ingredient per capsule

| | Mg. |
|---|---|
| 5-ethylamine - 6 - chloro-1H-imidazo[4,5-b]pyrazin-2-one | 50 |
| Lactose | 275 |
| Mixed powders | 325 |

Mix the 5-ethylamino - 6 - chloro-1H-imidazo[4,5-b] pyrazin-2-one and lactose and reduce to a No. 60 mesh powder. Encapsulate, filling 325 mg. in each No. 2 capsule.

The above formulation employing more or less active ingredients or a combination of active ingredients can be employed to prepare capsules of the other novel compounds of this invention hereinbefore described.

FORMULATION 2

[Inhalation aerosol containing 0.1 mg. of 5-ethylamino-6-chloro-1H-imidazo[4,5-b]-pyrazin-2-ones]

| | Per container, gram | Per 150 containers, grams |
|---|---|---|
| 5-ethylamino-6-chloro-1H-imidazo[4,5-b]pyrazin-2-one | 0.020 | 3.0 |
| Freon 11 | 0.530 | 79.5 |
| Freon 12/114 | 13.450 | 2,017.5 |

Procedure: A concentrate containing 3 gm. 5-ethyl-amino-6-chloro-1H-imidazo[4,5-b]pyrazin-2-one and 79.5 gm. Freon 11 (trichlorofluoromethane) in a 250 ml. capacity plastic coated bottle containing approximately 100 gm. of 6 mm. glass beads is roller milled for 48 hours to reduce the drug to a particle size of less than 10μ. A sufficient quantity of the milled concentrate (0.55 gm.) cooled to an appropriate temperature is transferred to each of the pre-cooled containers. The required amount of Freon 12/114 (dichlorodifluoromethane/1,2-dichloro-1,1,2,2-tetrafluoroethane) is added and the container is sealed under pressure with a metering valve fitted with a plastic actuator and mouthpiece.

FORMULATION 3

[Inhalation aerosol containing 0.5 mg. of 5-ethylamino-6-chloro-1H-imidazo[4,5-b]pyrazin-2-one]

| | Per container, gram | Per 150 containers, grams |
|---|---|---|
| 5-ethylamino-6-chloro-1H-imidazo[4,5-b]pyrazin-2-one | 0.1 | 2.00 |
| Freon 11 | 0.5 | 10.00 |
| Ascorbic acid | 0.0035 | .070 |
| Anhydrous ethanol | 0.56 | 11.2 |
| Freon 12/114 | 14.00 | 280.00 |

Procedure: The drug is dispersed in the Freon 11 (trichlorofluoromethane), milled to the desired particle size in the manner described in Formulation 2 and subdivided into the individual containers. Sufficient Freon 12/114 (dichlorodifluoromethane/1.2 - dichloro - 1,1,2,2 - tetrafluoroethane) is added to each container. The ascorbic acid dissolved in the anhydrous ethanol is likewise subdivided into individual containers. All operations are performed at an appropriately chosen temperature. Finally, the containers are sealed in the manner described in Formulation 2. Dosage forms containing from 0.2 to 1.0 mg. of active ingredient per spray can be prepared in a manner identical to that described above.

While the invention has been described with particular reference to certain variables in the process conditions and compound substituents, it is to be understood that the invention embraces related processes and substituents which are obvious extensions of those disclosed.

What is claimed is:

1. A process for the preparation of 5-NR¹R²-6-chloro-imidazo[4,5-b]pyrazin-2-ones of structure

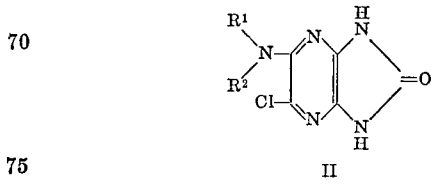

II wherein
R¹ is a member selected from the group consisting of
(1) hydrogen,
(2) $C_{3-7}$ cycloalkyl,
(3) phenyl,
(4) lower alkyl-amidino,
(5) lower alkylcarbonyl-amidino,
(6) lower alkynyl,
(7) lower alkenyl,
(8) lower alkyl,
(9) hydroxy-lower alkyl,
(10) lower (alkoxy-alkyl),
(11) pyridyl-lower alkyl,
(12) phenyl-lower alkyl,
(13) halophenyllower alkyl,
(14) amino-lower alkyl wherein the amino group is of structure

wherein
R⁵ is a member selected from the group consisting of
(a) hydrogen,
(b) lower alkyl,
(c) lower alkylcarbonyl, and
R⁶ is a member selected from the group consisting of
(a) hydrogen, and
(b) lower alkyl, and
wherein R⁵ and R⁶ when lower alkyl can be linked together to form a saturated 5-6 membered heterocycle containing at least 1 nitrogen atom and up to 1 other heteroatom selected from oxygen and nitrogen which when nitrogen can be substituted with lower alkyl;
R² is a member selected from the group consisting of
(1) hydrogen, and
(2) lower alkyl, and
wherein R¹ and R² when lower alkyl can be linked together to form a saturated 5-6 membered heterocycle containing at least 1 nitrogen atom and up to 1 other heteroatom selected from oxygen and nitrogen which when nitrogen can be substituted with lower alkyl which comprises heating a compound of structural formula

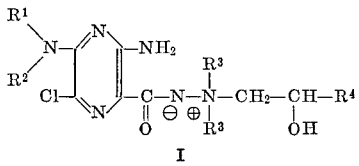
I to between 75° C. and the melting point of Compound I, wherein R¹ and R² are as defined above, R³ is lower alkyl, and R⁴ is selected from hydrogen and lower alkyl.

2. The process as claimed in claim 1, wherein the reaction is conducted in an organic solvent for Compound I, having a boiling point above 78° C.

3. The process as claimed in claim 1, wherein the reaction is conducted neat.

4. The process as claimed in claim 1, wherein the reaction is conducted with Compound I in suspension in an organic liquid with a boiling point above the melting point of Compound I.

5. The process as claimed in claim 1, wherein R¹ is lower alkyl, R² is hydrogen, and R³ and R⁴ are as defined in claim 1.

6. The process as claimed in claim 1, wherein R¹ is lower alkyl, R² is hydrogen, and each of R³ and R⁴ is methyl.

7. The process as claimed in claim 1, wherein R¹ is

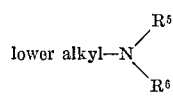

R² is hydrogen, and R³, R⁴, R⁵ and R⁶ are as defined in claim 1.

8. The process as claimed in claim 1, wherein R¹ is

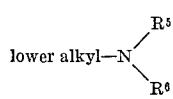

R² is hydrogen, each of R³ and R⁴ is methyl, and R⁵ and R⁶ are as defined in claim 1.

9. The process as claimed in claim 1, wherein R¹ is

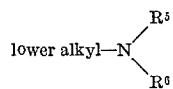

R² is hydrogen, each of R³ and R⁴ is lower alkyl, and each of R⁵ and R⁶ is lower alkyl.

10. The process as claimed in claim 1 wherein R¹ is

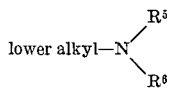

R² is hydrogen, each of R³ and R⁴ is methyl, and each of R⁵ and R⁶ is lower alkyl.

11. A process for the preparation of 5-ethylamino-6-chloro-1H-imidazo[4,5-b]pyrazin-2-one of formula

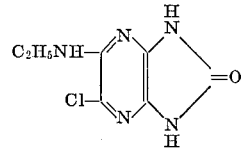

which comprises heating at from 75° C. to its melting point, 1,1-dimethyl-1-(2-hydroxy propyl)-2-(3-amino-5-ethylamino-6-chloropyrazinoyl)aminimide of structure

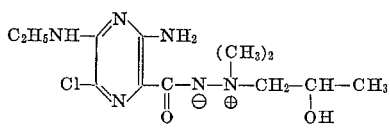

12. The compound of structural formula

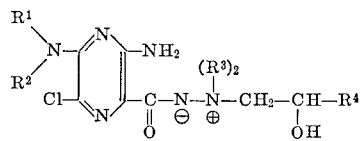

wherein
R¹ is a member selected from the group consisting of
(1) hydrogen,
(2) $C_{3-7}$ cycloalkyl,
(3) phenyl,
(4) lower alkyl-amidino,
(5) lower alkylcarbonyl-amidino,
(6) lower alkynyl,
(7) lower alkenyl,
(8) lower alkyl,
(9) hydroxy-lower alkyl,
(10) lower (alkoxy-alkyl),
(11) pyridyl-lower alkyl,
(12) phenyl-lower alkyl,
(13) halophenyl-lower alkyl,
(14) amino-lower alkyl wherein the amino group is of structure

wherein
R⁵ is a member selected from the group consisting of
(a) hydrogen,
(b) lower alkyl,
(c) lower alkylcarbonyl, and
R⁶ is a member selected from the group consisting of
(a) hydrogen, and
(b) lower alkyl, and
wherein R⁵ and R⁶ when lower alkyl can be linked together to form a saturated 5–6 membered heterocycle containing at least 1 nitrogen atom and up to 1 other heteroatom selected from oxygen and nitrogen which when nitrogen can be substituted with lower alkyl;
R² is a member selected from the group consisting of
(1) hydrogen, and
(2) lower alkyl, and
wherein R¹ and R² when lower alkyl can be linked together to form a saturated 5–6 membered heterocycle containing at least 1 nitrogen atom and up to 1 other heteroatom selected from oxygen and nitrogen which when nitrogen can be substituted with lower alkyl;
R³ is lower alkyl; and
R⁴ is a member selected from the group consisting of hydrogen and lower alkyl.

13. The compound as claimed in claim 12, wherein R¹ is lower alkyl, R² is hydrogen, and R³ and R⁴ are as defined in claim 1.

14. The compound as claimed in claim 12 wherein R¹ is lower alkyl, R² is hydrogen, and R³ and R⁴ are each methyl.

15. The compound as claimed in claim 12 wherein R¹ is

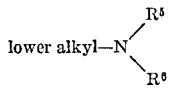

R² is hydrogen, and R³, R⁴, R⁵ and R⁶ are as defined in claim 12.

16. The compound as claimed in claim 12, wherein R¹ is

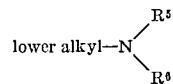

R² is hydrogen, R³ and R⁴ are each methyl, and R⁵ and R⁶ are as defined in claim 12.

17. The compound as claimed in claim 12 wherein R¹ is

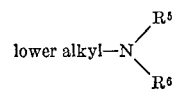

R² is hydrogen, R³ and R⁴ are each lower alkyl, and R⁵ and R⁶ are each lower alkyl.

18. The compound as claimed in claim 12 wherein R¹ is

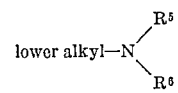

R² is hydrogen, R³ and R⁴ are each methyl, and R⁵ and R⁶ are each lower alkyl.

19. 1,1-dimethyl-1-(2-hydroxypropyl)-2-(3-amino-5-ethylamino-6-chloropyrazinoyl)aminimide.

20. 1,1-dimethyl-1-(2-hydroxypropyl)-2-(3-amino-5-dimethylaminoethylamino-6-chloropyrazinoyl)aminimide.

References Cited
UNITED STATES PATENTS 3,240,780   3/1966   Cragoe et al. _____ 260—250
3,274,192   9/1966   Cragoe et al. _____ 260—250

NICHOLAS S. RIZZO, Primary Examiner

U.S. Cl. X.R.

424—250; 260—247.2

UNITED STATES PATENT OFFICE
CERTIFICATE OF CORRECTION

Patent No. 3,567,725      Dated March 2, 1971

Inventor(s) Edward J. J. Grabowski et al.

It is certified that error appears in the above-identified patent and that said Letters Patent are hereby corrected as shown below:

In column 5, under heading $R^1$, Preparation A-2, "$CH\equiv C-CH_2-$" should be --- $CH\equiv C-CH_2-$ ---;

In column 5, under heading $R^1$, Preparation A-12, "$(CH_3)_2N(CH_2)_3-$" should be --- $(CH_3)_2N(CH_2)_4-$ ---;

In Column 5, under heading $R^1$, Preparation A-11, "$(CH_3)_2NH-(CH_2)_3-$" should read --- $(CH_3)_2N-(CH_2)_3-$ ---;

In column 6, under heading Found, Preparation A-17, "41.99" should be ---41.90---;

In column 6, line 59, "49.4g." should be ---49.9g.---;

In column 6, line 64, "286.5" should be ---26.5---;

In column 8, under heading $R^4$, Preparation B-13, "$C_5H_{11}-$" should be --- $CH_3-$ ---;

In column 8, under heading $R^4$, Preparation B-14, "$CH_3-$" should be --- $C_5H_{11}-$ ---;

In column 7, under heading $R^1$, Preparation B-17, --- $HOCH_2CH_2-$ --- should be added;

In Table III, in the heading bridging columns 9-10 and columns 11-12, "$\diagdown_X\diagup$" in formula on right side should read --- $\diagdown\underset{H}{\overset{H}{N}}\diagup$ ---; and In column 13, line 4, "$C_{3-7}$ cycloalkyl" should be ---$C_{3-7}$ cycloalkyl---.

Signed and sealed this 2nd day of November 1971.

(SEAL)
Attest:

EDWARD M. FLETCHER, JR.      ROBERT GOTTSCHALK
Attesting Officer      Acting Commissioner of Pat